United States Patent

Petersen et al.

[11] 3,918,298
[45] Nov. 11, 1975

[54] MULTIPLE ACTUATOR CONTROL SYSTEM

[75] Inventors: Niel R. Petersen, Hopkins; Rodney L. Larson, Minnetonka, both of Minn.

[73] Assignee: MTS Systems Corporation, Minneapolis, Minn.

[22] Filed: July 29, 1974

[21] Appl. No.: 492,448

[52] U.S. Cl. ................................................. 73/71.6
[51] Int. Cl.² ........................................ G01N 29/00
[58] Field of Search......... 73/71.6, 71.5 R, 67, 67.2, 73/71.4; 318/564

[56] References Cited
UNITED STATES PATENTS

| | | | |
|---|---|---|---|
| 3,393,555 | 7/1968 | Flannelly | 73/71.6 |
| 3,477,281 | 11/1969 | Helmuth | 73/71.6 |
| 3,654,804 | 4/1972 | Helmuth | 73/71.6 |
| 3,800,588 | 4/1974 | Larson et al. | 73/71.6 |

OTHER PUBLICATIONS

Newton, Jack, *Shock and Vibration Bulletin*, "Methods of Control of Multiple Shaker Testing System," Jan. 1966, No. 35, part 2, pp. 85–96.

*Primary Examiner*—Richard C. Queisser
*Assistant Examiner*—Stephen A. Kreitman
*Attorney, Agent, or Firm*—Dugger, Johnson & Westman

[57] ABSTRACT

A multiple actuator control system for vibration tables which has a plurality of actuators vibrating a rigid table which will not comply to any substantial degree to differentials in load between the actuators including a control system which utilizes a force discrepancy adjustment signal for each of the actuators to compensate for differentials in the force on each actuator in relation to the average force of the other actuators.

11 Claims, 6 Drawing Figures

MULTIPLE ACTUATOR CONTROL SYSTEM

BACKGROUND OF THE INVENTION

1. Field of the Invention

This invention relates to test apparatus utilizing a plurality of actuators controlling the movements of a rigid structure in a vibratory path.

2. Prior Art

A multiple actuator control system for vibration test apparatus which utilizes the movements of four actuators operating on rigid structures is disclosed in our U.S. Pat. No. 3,800,588. The present disclosure deals with improvements in the control system over that shown in our patent which utilizes a force discrepancy signal for each actuator derived by comparing the individual force on each of the actuators with relation to an average force of the plurality of actuators.

SUMMARY OF THE INVENTION

The present invention relates to control of hydraulic actuators for generating displacement of a rigid table that is being vibrated. The control includes means for equalizing the force provided by each actuator to optimize the operation by deriving a force discrepancy signal for each of the actuators and using the force discrepancy signal to aid in properly controlling the actuator.

The actuators are positioned as shown in asymmetrical or random locations on the rigid structure. The present system may be used to control any number of actuators to vibrate the structure in a desired plane or direction.

In controlling rigid structures such as a large table, it is also important to keep the table plane properly oriented with respect to a reference plane, or if the table is to be rolled about a roll axis, or pivoted about a pitch axis, suitable controls for these motions also must be provided. When multiple actuators are utilized the actuators may be and in many cases will be operating at different radii from the controlled axis. The present device further includes means for compensating for different spacing of the actuators with respect to the desired control axis. An error signal is developed from displacement feedback signals to indicate the position of the table about the controlled axis and the error signal is scaled for each actuator control signal in proportion to the distance that each actuator is located from the controlled axis.

The control system permits the table to be rolled and/or pitched at the same time it is vibrated in a linear direction.

In the description, the rigid structure is disclosed as a rigid table which does not comply or bend when subjected to differentials in force from the actuators. The table is moved in a vertical direction with respect to a horizontal base. It is to be understood, however, that actuators could be placed at opposite ends of the table, and the table vibrated in a horizontal plane. The same type of control system can be utilized to insure that the actuators which would move the rigid structure in a horizontal plane carry equal forces.

The compensating signals which are used to correct force inequality between the actuators is derived by averaging the forces of the actuators affected, and then comparing or summing this average force with the individual force feedback signal of each of the actuators that is being controlled. This force discrepancy signal is provided to the servo valve controlling that hydraulic actuator to either increase or decrease the actuator velocity to compensate for and remove such force inequalities.

If the rigid structure is being vibrated in a horizontal plane, an axis about which the structure or table may be controlled may be a "yaw" axis or in other words a vertical axis.

Rate and differential pressure or acceleration stabilization signals may also be provided in each servo system to the actuators to compensate for a resonant frequency which may otherwise cause control problems, being caused by the finite compliance of the actuators and the mass of the table or structure. Such control systems are shown only schematically in that they are known in the art and are also present in our U.S. Pat. No. 3,800,588.

DESCRIPTION OF THE PREFERRED EMBODIMENTS

Figure 1:
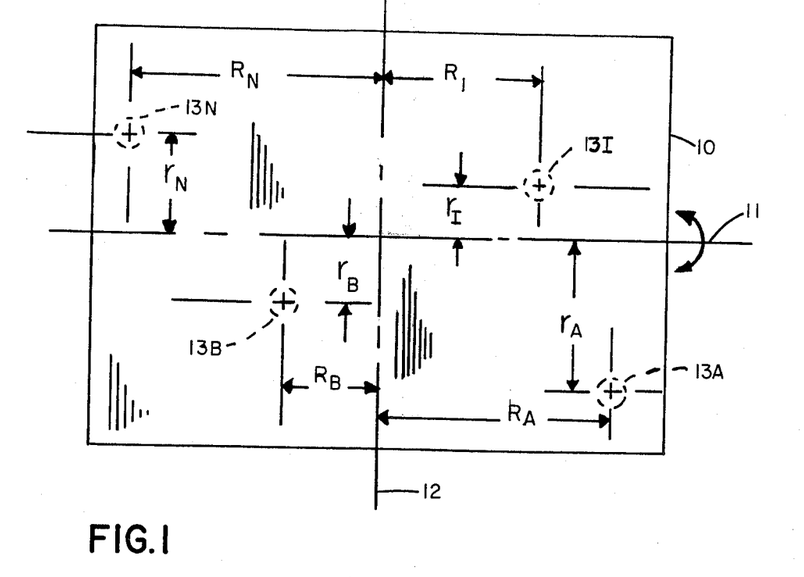
FIG. 1 is a top plan view of a typical rigid table or structure graphically depicting the position of hydraulic actuators used for vibrating the table.

FIG. 1 is a schematic top plan view of a rigid test table 10 on which the control system is used. The rigid table 10 is moved by displacement generating hydraulic actuators 13. The term rigid means that the table does not appreciably deflect or comply if there are differentials in force from the actuators used therewith. Thus any force difference in one of the actuators results in the change of the force of the other actuators generally in an opposite sense. The number of actuators used for vibrating the table 10 can be varied, and with the control system of the present invention the exact placement of the actuators relative to the control axes is not of critical importance in that compensation is made for the different actuator spacing with respect to the roll axis of the table and pitch axis of the table. A signal is provided for each actuator which is a function of the difference in force of each actuator from the average force of the actuators to tend to drive each actuator back to a point where all actuators will be applying equal force.

Figure 2:
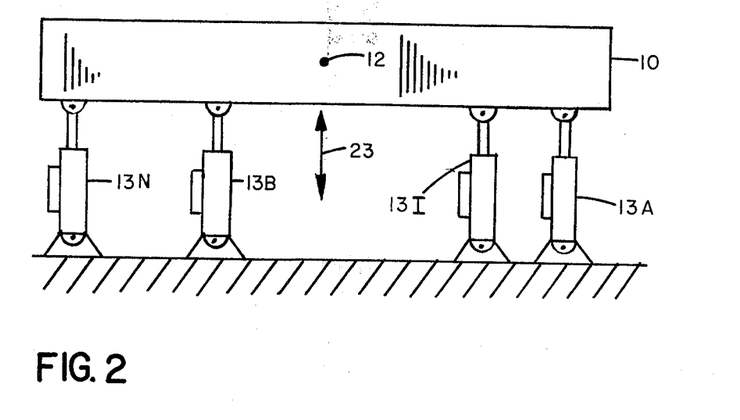
FIG. 2 is a side elevational view of the device of FIG. 1.

The table pitch axis is indicated at 11, and the roll axis is indicated at 12, which axes are at right angles to each other and are selected for reference purposes. As can be seen the individual actuators 13 are shown only in dotted lines in FIG. 1 because they are underneath the table. These actuators are also shown in FIG. 2, and schematically in FIG. 4. The actuators 13 include actuators 13A, 13B and to represent an indeterminate number of actuators, up to a total of N, an actuator 13I is presented as being an intermediate actuator, and the final or Nth actuator is actuator 13N. The actuators are not necessarily symmetrically located with respect to the roll and pitch axes of the table.

For clarification of the terms, the distance of the individual actuators from the pitch axis 11 is indicated by $r$ with the pitch axis radius for each individual actuator having the appropriate subscript, namely $r_A$, $r_B$, $r_I$ and $r_N$. The distance of the actuators from the roll axis 12 is represented by "R". Again, the individual distances are represented as $R_A$, $R_B$, $R_I$ and $R_N$. It can be seen that to provide the proper sense for signals provided to the actuators the $r$ and $R$ values can be negative if they are on the opposite side of one of the respective axis from the side that is selected as being of positive value. It is presupposed that the pitch axis is between two of the actuators, and the roll axis also will fall between at least two of the actuators.

While in the example shown in FIGS. 1 and 2, the table will be vibrated in a vertical direction and the pitch and roll of the table will normally be kept at zero so the table remains parallel to a reference plane, it should be noted that the actuators could be placed at the ends of the table to shake the table endwise in a horizontal plane, or actuators could be placed along the sides of the table to also shake the table transversely in a horizontal plane, or the table could be vibrated in a combination of these directions at once.

Figure 4:
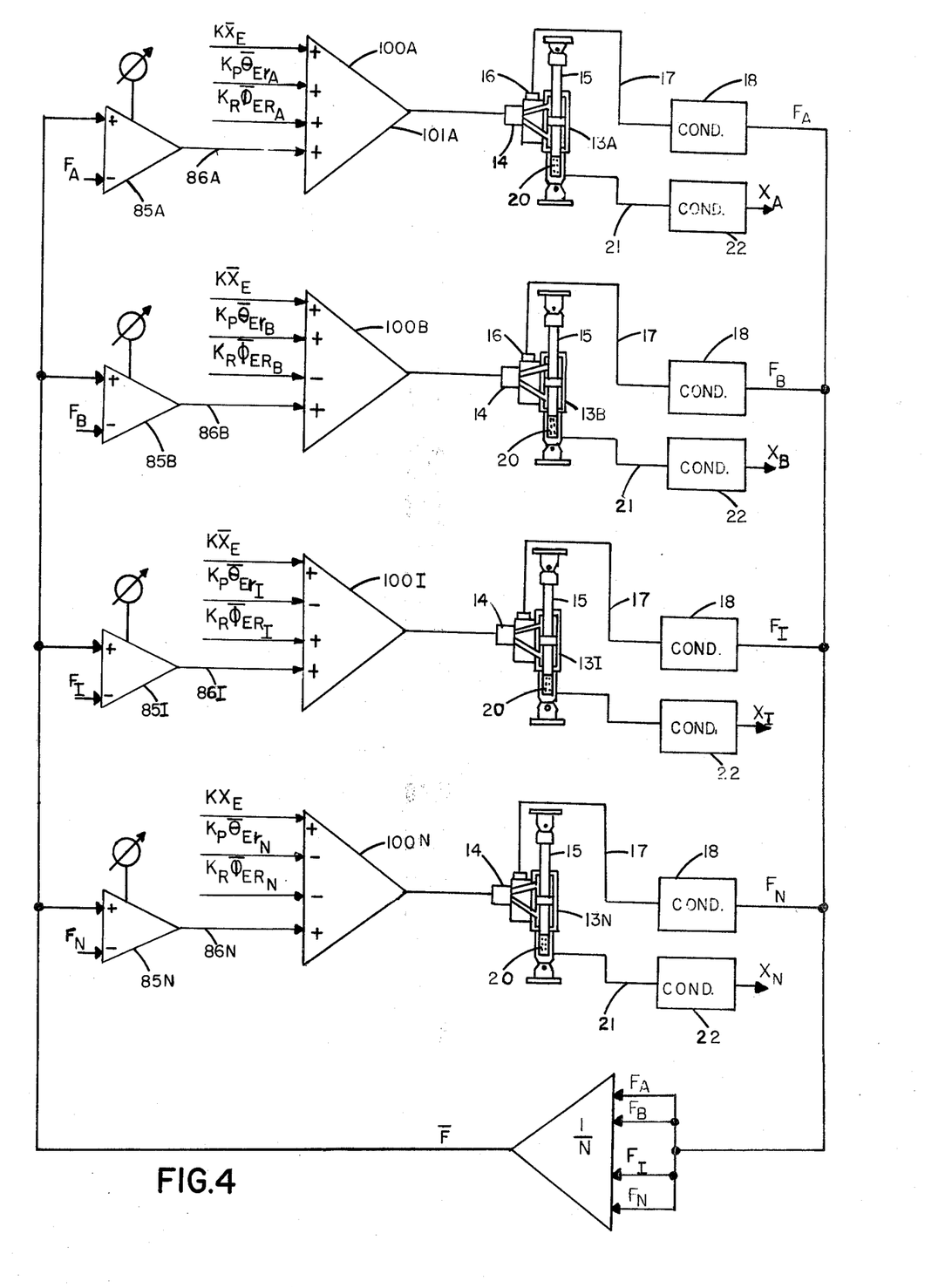
FIG. 4 is a schematic representation of the actuators feedback connection and the final control circuitry receiving inputs from the servo controllers of FIGS. 3A–3C and operating the servo valves for the actuators.

Referring first to FIG. 4, the individual actuators 13A, 13B, 13I and 13N are illustrated schematically. These actuators are controlled by electro-hydraulic flow control servo valves 14 that connect through suitable manifolds to the individual actuators. The actuators are double acting hydraulic cylinders having piston rods 15 and the piston rods 15 can be extended or retracted by operation of the flow control servo valve supplying fluid under pressure which acts on a piston connected to the rod. The command signals to the servo valves act to drive the actuator in the proper direction. A flow control servo valve is basically a fluid flow rate control device which generates the velocity of movement of the actuator rod 15 in a particular direction by controlling the flow of hydraulic fluid under pressure to the proper side of the piston connected to the rod 15, while permitting hydraulic fluid from the opposite side of the piston to return to drain.

A differential pressure sensor 16 is provided on each of the actuators to provide a differential pressure signal along lines 17 to separate signal conditioners 18 for each of the actuators. The signal conditioners 18 include circuitry for providing the necessary excitation for the pressure transducers, and delivering an output signal of suitable form proportional to the differential pressure and which can be utilized in the rest of the servo controls. The differential pressure signal is proportional to the force exerted by the actuator.

In addition, a displacement transducer of known design indicated generally at 20 is attached to each of the actuators, and provides a displacement signal along lines 21 to conditioner circuitry 22, which provide an output signal from each of the transducers indicating the position of its corresponding actuator rod 15 with respect to a reference position.

The differential pressure transducers 16 provide signals that are proportional to the differential in pressure across the piston of each of the actuators, and the signal therefore is proportional also to force being exerted by the actuator. These signals are indicated by capital F with a subscript indicating which particular actuator is being used i.e. $F_A$, $F_B$ etc. The displacement transducers provide a displacement signal X with the appropriate subscript indicating each of the individual actuators under consideration i.e. $X_A$, $X_B$ etc. Lines depicted as illustrating connections are not individual lines but are sufficient in number to provide for transmission of the required signals. It is to be understood that where a particular representation of a signal is provided at an input of an amplifier or the like without a physical line connecting the components, the input ties back to the source of the corresponding signal.

Figure 3A:
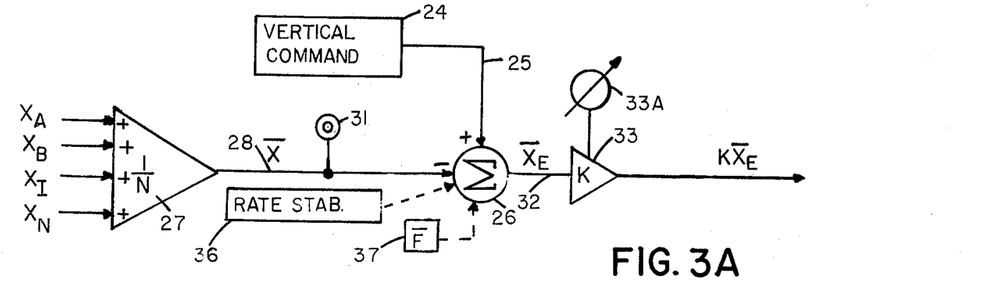
FIG. 3A is a schematic representation of the vertical servo controller used for controlling vertical motions of the rigid structure of FIG. 1.

Referring now to FIG. 3A, the servo controller for controlling the actuators in linear vertical movement is shown. This is the vertical reciprocation of the table as shown by arrow 23 in FIG. 2. A command signal source for vertical displacement command is shown schematically at 24. This displacement command signal source can be a tape recorder or other suitable source of static or dynamically varying signal that drives the actuators in their reciprocating movement. The vertical command signal is provided to each of the actuators, as a time varying signal indicating the desired displacement of the actuators as a function of time. The command signal is provided along a line 25 to a summing junction 26. The individual displacement signals $X_A - X_N$, which are signals that indicate the actual displacement of the respective actuators, are provided to the inputs of an averaging amplifier indicated generally at 27, which has, as is shown, an individual input for each of the actuators to receive the actual displacement signals from the actuators and to provide an output signal along the line 28 that is the average displacement ($\overline{X}$) of all the actuators being controlled. This may be expressed mathmatically as $$\overline{X} = \frac{X_A + X_B + ... X_I + ... X_N}{N}.$$

If there are actuators on opposite sides of the table, or opposite ends of the tables, the signals on one side or end would have to be inverted at the averaging amplifier in that while some actuators were extending, the actuators on the opposite side or end would be retracting.

The average actual displacement can be provided to a readout device shown schematically at 31, if desired, and the signal on line 28 is also fed to an inverting input terminal to summer 26. In the form shown summer 26 may sum only these two signals to provide an error signal on line 32 which represents the average error of the actuators. That is, the desired displacement is compared with the average actual displacement and the error is the average displacement error. This signal is represented by the symbol $\overline{X}_E$. The $\overline{X}_E$ signal is fed into an amplifier 33 that has an adjustable gain 33A, and which provides a gain constant to the error signal and which therefore provides a signal $K\overline{X}_E$ at its output.

The $KX_E$ signal is used as a primary signal for controlling each of the actuators, and is supplied to each of the individual actuator control channels for the number of actuators (N) that are used in the system.

It should also be noted that as illustrated in a previous U.S. Pat. No. 3,800,588, additional stabilization signals can be supplied to the summer 26.

Figure 3B:
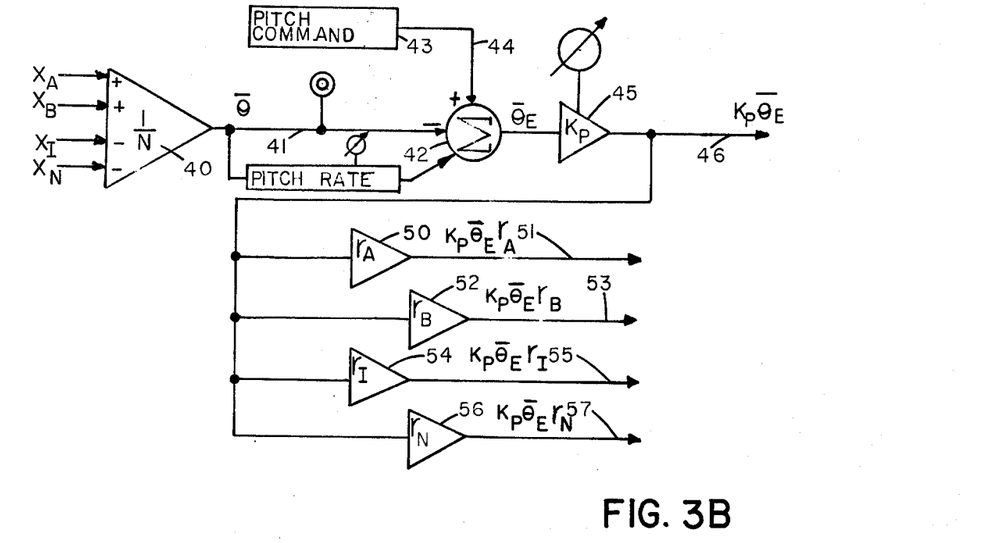
FIG. 3B is a schematic representation of a servo controller used for controlling movement of the table about a pitch axis.
Figure 3C:
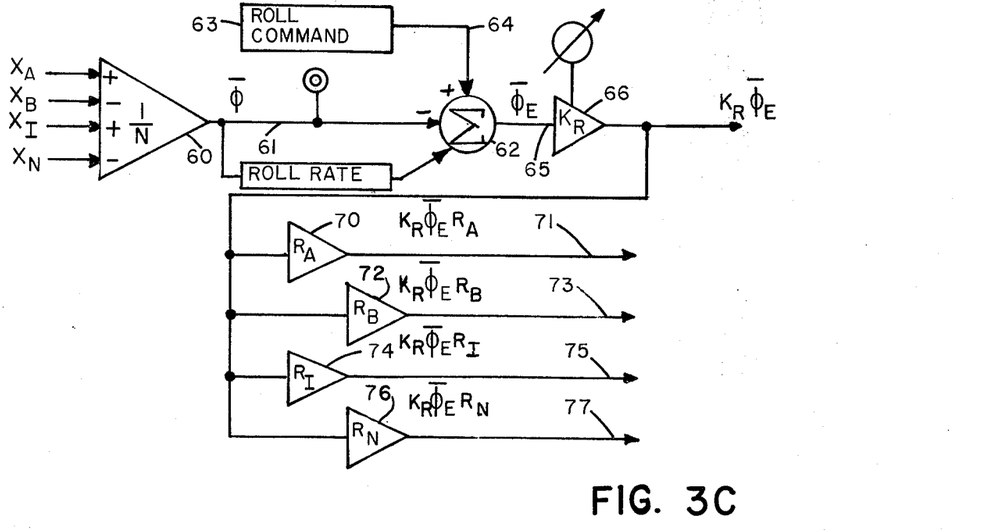
FIG. 3C is a schematic representation of a servo controller used for controlling movement of the rigid table about a roll axis.

For example, rate stabilization may be provided which can be a differentiated signal of the average vertical displacement signal on line 28, or it could be provided by accelerometers or by separate sensors. Rate stabilization circuitry is indicated generally at 36 as an optional input to the summer 26. In addition, a differential pressure stabilization signal can be provided to the summer 26. This signal comprises an average of the differential pressure signals or the force signals (represented by $\overline{F}$) to compensate for the resonant effects of oil column compression. At the frequencies of operation of devices of this kind, hydraulic oil, which is normally thought of as an incompressible fluid does compress slightly, and the effects of this oil column compression can be compensated for by the stabilization circuitry comprising an average of the differential pressure signals. The average differential pressure is derived by an averaging amplifier 80 which will be subsequently identified. The $\overline{F}$ signal is subjected to a suitable gain control as needed for the summer 26. It is to be understood that each of the individual servo controllers including the controllers of FIGS. 3B and C can utilize such stabilization signals, if necessary or desired.

In controlling the rigid table or structure 10 about either a roll or pitch axis, or, for that matter, any other selected axis, servo controllers must be provided to insure that the table remains properly oriented. In most instances, the table is meant to be kept horizontal so that there is not any separate ptich command to cause differential displacement between the actuators on opposite sides of the pitch axis at the same time the table is being moved up and down. As shown in FIG. 3B, the pitch servo controller provides the necessary control functions and also provides compensation for the different radii of action of the actuators with respect to the pitch axis.

An averaging amplifier 40 is provided, and it has a plurality of inputs each connected to receive the signal indicating displacement of the respective actuators, namely $X_A$ through $X_N$. As explained, where the actuators 13A and 13B are on one side of the pitch axis, and the actuators 13I and 13N are on the opposite side of the axis, in order to substantially determine the average pitch about this pitch axis signals from the actuators on one side are considered to be positive while signals from the actuators on the opposite side must be inverted. Thus, the inputs for the displacement signals $X_A$ and $X_B$ are indicated as being positive to the averaging amplifier 40 and the inputs $X_I$ and $X_N$ are indicated as being negative or inverted inputs. The averaging amplifier 40 provides an output signal indicated as $\overline{\theta}$ which represents the average pitch about the pitch axis, or in other words the difference in displacement between the actuators on opposite sides of the pitch axis divided by the total number of actuators. The operation of amplifier 40 can be expressed:

$$\overline{\theta} = \frac{X_A + X_B \ldots + X_I \ldots + X_N}{N}$$

This average pitch signal $\overline{\theta}$ is provided on the output line 41 of the amplifier 40 and is fed into an inverting input of summer 42. Summer 42 has the function of comparing a pitch command signal from a command source 43, which is delivered along line 44 to a noninverting input of the summer 42, with the average pitch as actually measured by the displacements of the actuators. If no pitch command is desired, or in other words if the table is to be held level or horizontal, then the input along line 44 would be zero and the average pitch, $\overline{\theta}$ would be also the average pitch error. The output of the summer 42 provides average pitch error signal $\overline{\theta}_E$ to a pitch gain amplifier 45 which provides a constant multiplication factor of $K_p$ and at its output line 46 the function $K_P\overline{\theta}_E$ is provided. This signal can be used to compensate the drive signal for the servo valves for pitch errors.

As previously mentioned it should be noted that some of the actuators 13 are in a different radius ($r$) from the pitch axis. If each of the actuators is provided with the same pitch error signal, the amount of compensation would be incorrect, because some of the actuators have to be moved a greater amount than other of the actuators to provide the necessary compensation. This difference in displacement necessary to achieve the desired pitch about the axis is proportional to the radius of that actuator from the pitch axis. Therefore, the quantity $K_P\overline{\theta}_E$ signal is scaled through scaling amplifiers each of which provides a gain substantially proportional to the radius of the respective actuator from the pitch axis.

For example, signal $K\overline{\theta}_E$ is connected to a first scaling amplifier 50 that multiples the signal $\overline{\theta}_E$ times a quantity proportional to $r_A$ and gives an output along line 51 equal to $K_P\overline{\theta}_E r_A$. Likewise, a second scaling amplifier 52 provides a signal on line 53 that is the pitch error signal times the gain of the amplifier 52, which is proportional to $r_B$ to deliver $K_P\overline{\theta}_E r_B$. An amplifier 54 provides an output $K_P\overline{\theta}_E r_N$ on line 55, and amplifier 56 provides an output $K_P\overline{\theta}_E r_N$ on line 57, which signals are for actuators I and N, respectively. The output signals on lines 51, 53, 55 and 57 (there will be one line and signal for each of the actuators) will be used as a input to develop the final signal for driving of the servo valve.

Referring to FIG. 3C, the roll axis servo controller is shown, and includes means to compensate for differentials in radii of operation of the individual actuators about the selected roll axis. As shown, an averaging amplifier 60 has inputs from the displacement signal conditioners 22 of each of the respective actuators (X signals). In order to obtain the proper polarity of signals, the actuators on a first side of the roll axis are considered to have positive signals, while actuators on the other side of the roll axis are passed through inverting inputs to the averaging amplifier 60. In this particular case, the signal $X_A$ comes to a positive terminal while the signal $X_B$ is inverted, as is the signal $X_N$. The averaging amplifier 60 then gives an average roll error signal $\overline{\phi}$ to indicate the amount of roll about the roll axis on the output line 61 of this amplifier.

This signal $\overline{\phi}$ is provided to a summer 62, which also received a second input from a roll command source 63 along a line 64. The signal $\overline{\phi}$ goes through an inverting input of the summer 62, while the roll command signal (if there is any) is supplied to a noninverting terminal, and these signals are compared so that if there is any error between the desired roll command signal and the average roll signal, an error signal $\overline{\phi}_E$ is provided at the output of the summer along line 65. Signal $\overline{\phi}_E$ is passed through a gain amplifier 66 which provides a constant factor $K_R$, and delivers signal $K_R\overline{\phi}_E$ at its output.

As previously noted, the radius of operation of the various actuators from the roll axis is not the same and therefore the output of amplifier 66 is fed through roll axis scaling amplifiers which have gains proportional to the respective radii of actuator operation. For example an amplifier 70 provides a signal $K_R\bar{\phi}_E R_A$ along line 71 which is scaled proportional to $R_A$; amplifier 72 provides an output $K_R\bar{\theta}_E R_B$ along line 73 which provides a scaling constant $R_B$; an amplifier 74 provides a signal $K_R\bar{\theta}_E R_I$ on line 75; and an amplifier 76 provides a signal $K_R\bar{\theta}_E R_N$ on line 77.

In addition to the previously mentioned signals needed for control of the actuators in the vertical direction, about the pitch axis and about the roll axis, it is important that each of the individual actuators carry its share of the load. To insure equalizing the forces or loads, a force feedback signal is utilized wherein the difference in force provided by each of the actuators from the average force of all the actuators is used as a compensating signal to the input of the servo valves to compensate for the individual force difference or discrepancy from the average force.

Referring to FIG. 4, the average force is obtained by the use of a summing amplifier 80 that has a plurality of inputs, each connected to one of the conditioners 18 delivering the differential pressure signal (F) and then dividing the total by the number of actuators so that an output along line 81 is an average force signal $\bar{F}$. This average force signal may be used for a stabilization signal to the input of active summing circuits such as summer 26 and the signal also is supplied to each of a plurality of individual force discrepancy comparators or summers that are used for comparing the individual differential pressure or force signals of each of the actuators with the average force signal. For example, in amplifier 85A the average force signal is provided at one input, and the individual force signal $F_A$ is provided at an inverting input. The comparator delivers a signal through an output line 86A that is representative of the difference between the individual actuator force and the average force. This may be expressed for the general case as $$\left[ E_i = K\left(F_I - \frac{(F_A + F_B \ldots F_N)}{N}\right) \right]$$

$E_i$ is the compensating signal for an individual actuator, $F_i$ is the force signal from that individual actuator and the average force is the final portion of the equation. K is a constant representing the gain of the comparator amplifiers 85. Each of the individual actuators and actuator controls have a comparator or summer 85 as designated in the drawings, and in the case shown for proper polarities the inverting input of each comparator amplifier is connected to the respective feedback force signal ($F_A, F_B \ldots F_I \ldots F_N$) from the conditioners 18 of that particular actuator. Thus, in the form shown if the average force signal $\bar{F}$ is greater than the force signal for an individual actuator, the signal on the particular line 86 will be a positive signal that will be used to increase the signal controlling the servo valve and ultimately to tend to accelerate that actuator and make that particular actuator carry an equal share of the load. If, however, in the form shown the force feedback signal from an individual actuator is greater than the average force, the inverted sense of the individual input to amplifiers 85 causes a negative signal to be provided on the respective line 86, and such negative signals will then be used to tend to decrease the control signal provided to that particular servo valve for that actuator.

In this way, each of the actuators is provided with a force balance signal that compares the individual actuator's force, as actually provided by the actuator, with the average force actually exerted by all of the actuators. This force difference signal can be provided in a vibration system using an indeterminate number of actuators.

The final control phase for each of the servo valves is summing amplifiers 100A–100N each of which receives an input from the vertical servo controller $K\bar{X}_E$, an input from the respective scaling amplifier from the pitch servo controller and the roll servo controller, and a separate force balance signal from the amplifiers 85. The outputs along the line 101A–100N to the respective servo valve are a summation of this signal times the amplifier gain. The polarity of the inputs is selected to achieve the proper signal sense. For example, for amplifier 100A the inputs are all positive and include the average displacement error signal $K\bar{X}_E$, the average pitch error signal times the radius of action of actuator A, $K\bar{\theta}_E r_1$; the average roll error signal times the radius of action of actuator A, $\bar{\phi}_E R_1$; and the force balance signal, which is the signal on line 86A representing the difference between the force being generated by actuator A and the average force of all the actuators.

The pitch and roll error signals are provided at either normal or inverting input terminals depending upon their position with respect to the particular axis. For example, the roll error signal for actuator 13B coming into the summing amplifier 100B is inverted because of the positioning of the actuator 13B on the opposite side of the roll axis from actuator 13A. The same is true for the pitch error signal to summing amplifier 100I, and both the pitch and roll error signals for summing amplifier 100N are inverted. The lines 86A, 86B, 86I and 86N each carry a separate force balance discrepancy signal to the respective summing amplifier 100.

In some instances, the servo valve controls will include a specific feedback directly to a valve driver circuit relating to the motion of the main stage spool of the servo valve, that would compare the signals on the lines 101 with such a valve feedback signal, but in other servo valve controls such direct feedback is not necessary.

In the example shown, the polarities of signals are established as follows: A positive signal at the servo valve input makes the piston go up (toward the table); a positive force signal is provided when the pressure on the lower side of the piston is greater than the pressure on the top side of the piston; a positive displacement signal is provided when the piston and rod move toward the top from a center zero position and a negative signal is provided when the piston and rod move downwardly from a center zero position; and in the case of movement about the roll and pitch axes, a positive angular displacement is when actuator 13A extends relative to the actuators on the respective opposite sides of the axes.

It should also be noted that the average force term as used in the claims is meant to be broad enough to include modification of the actual average force signal by constants or scaling factors to compensate for situations which require modification of the average force signal at one or more actuators to provide proper control. In other words, the term average force can be a weighted average force.

What is claimed is:

1. A test apparatus comprising a plurality of displacement generating devices for displacing a rigid structure constrained for movement in a vibratory path, first means for supplying to the displacement generating devices a time varying first command signal representative of a desired average displacement in relation to time of said structure to be produced by said displacement generating devices, second means coupled to the displacement generating devices for providing a second signal representative of the actual average displacement of said structure, third means coupled to said displacement generating devices for providing a separate third signal for each of said displacement generating devices representative of difference in the force applied to the structure by each respective displacement generating device and a function of the average force actually exerted by said displacement generating devices and applied to said structure, and fourth means to provide a separate control signal to control each of said displacement generating devices which is a function of the first and second signals, and the respective third signal for a respective displacement generating device.

2. The combination as specified in claim 1 and fifth means coupled to said displacement generating devices and to said fourth means to provide a rate stabilization signal which indicates the rate of displacement of said displacement generating devices.

3. The combination as specified in claim 1 wherein said rigid structure is rotatable by said displacement generating devices about an axis substantially perpendicular to the displacement direction of said displacement generating devices, and fifth means coupled to said displacement generating devices to provide a fifth signal indicative of the average angular displacement of said structure about said axis, and means to couple said fifth means to said fourth means.

4. The combination as specified in claim 3 wherein at least some of said displacement generating devices act on said rigid structure at a distance from said axis different from other displacement generating devices and wherein said fifth means includes scaling means to modify said fifth signal as a function of the distance of each of said displacement generating devices from said axis, said scaling means comprising a portion of the means to couple said fifth means to said fourth means.

5. The combination as specified in claim 4 and command means to provide a second command signal representing the desired amount of movement of said rigid structure about said axis, and said means to couple said fifth means to said fourth means including means to compare said fifth signal with said second command signal and to provide a signal representing the error between said fifth signal and said second command signal.

6. A control system for moving a large substantially rigid structure through an electronically commanded time related motion comprising a plurality of reciprocating actuators connected to said structure for moving said structure in a vibratory path, means to provide a command signal to reciprocate said actuators alternately in opposite directions to vibrate said structure, and means to adjust said command signal to cause equalization of the load between said actuators including means connected to each actuator providing signals indicating the force being exerted by each of said actuators and means connected to the last mentioned means to provide a separate signal to each actuator in the general form $$E_i = K\left(F_i - \left[\frac{(F_1 + F_2...F_N)}{N}\right]\right)$$

where $E_i$ equals the separate signal delivered to actuator i, $F_i$ is the force exerted by actuator $i$, the quantity $$\frac{F_1 + F_2...F_N}{N}$$

represents a function of the average force exerted by all of the actuators, and K is a constant.

7. The combination as specified in claim 6 wherein said means to adjust said command signal includes means connected to said reciprocating actuators to provide signals representing the displacement of said actuators, means to average the displacement signals from all of said actuators and to sum the average displacement signal with said command signal to provide a command error signal, and separate means connected to each of said actuators to sum said separate signal of the respective actuator and said command error signal to provide a control signal for each of said actuators.

8. A test apparatus comprising a plurality of displacement generating devices, a rigid structure connected to said displacement generating devices to be moved in a path by said displacement generating devices, said rigid structure having a control axis lying on a plane falling between at least some of said displacement generating devices, means connected to each of said displacement generating devices to provide signals representing the displacements of said generating devices with respect to a reference plane passing through said axis, means to sum and average said signals to provide an average error signal representing differential displacement of said actuators resulting in deviations of rotation of said structure about said control axis from a desired rotational position with respect to said reference plane, separate means for each of said displacement generating devices connected to receive said average error signal and to adjust said average error signal by a factor proportional to the distance the respective displacement generating device is from said control axis, and means to provide separate control signals to each of said displacement generating devices, each of said last mentioned means including means to receive a signal from said means to adjust for one displacement generating device and to modify the respective control signal for that displacement generating device in accordance therewith.

9. The test apparatus specified in claim 8 wherein said means to provide separate control signals includes means to provide a command signal, means connected to receive said signals representing the displacement of said displacement generating devices and to provide a signal representing the average of the displacement of said displacement generating devices, means to sum said command signal and the signal representing the average displacement to provide a displacement error signal, said means to receive a signal comprising a summing means to sum said last mentioned signal and the respective signal from said means to adjust for each of said displacement generating devices.

10. The test apparatus of claim 8 including means to provide a command signal representing the desired average displacement differential of said displacement generating devices with respect to said reference plane and wherein said means to sum and average said signals to provide an average error signal includes means to sum the average displacement of said displacement generating devices with respect to said reference plane and said command signal.

11. The system as specified in claim 7 wherein said means to receive a signal from said means to adjust for one displacement generating device includes inverting inputs to receive the signals for the displacement generating devices on one side of said axis with respect to a plane perpendicular to the first mentioned reference plane.

* * * * *

UNITED STATES PATENT AND TRADEMARK OFFICE
CERTIFICATE OF CORRECTION

PATENT NO. : 3,918,298
DATED : November 11, 1975
INVENTOR(S) : Niel R. Petersen et al.

It is certified that error appears in the above-identified patent and that said Letters Patent are hereby corrected as shown below:

Column 4, line 40 " $\bar{X} = \dfrac{X_A + X_R + \ldots X_I + X_N}{N}$ " should be -- $\bar{X} = X_A + X_B + \ldots X_I + X_N$ --; Column 4, line 63 "$KX_E$" should be --$K\bar{X}_E$--. Column 7, line 5 $\bar{\theta}_E$ should be --$\bar{\phi}_E$--; Line 7, $\bar{\theta}_E$ should be --$\bar{\phi}_E$--; line 8, $\bar{\theta}_E$ should be --$\bar{\phi}_E$--; Column 7, line 41-44, $[E_i = K\ F_i - (F_A + F_B \ldots F_N)]$ should be --$E_i = K[F_i - (F_A + F_B \ldots F_N)]$--. Column 10, line 1-4 "$E_i = K\ (F_i - \left[\dfrac{(F_1 + F_2 \ldots F_N)}{N}\right]$" should be --

$E_i = K\left[F_i - \dfrac{(F_1 + F_2 \ldots F_N)}{N}\right]$ --

Signed and Sealed this second Day of March 1976

[SEAL]

Attest:

RUTH C. MASON
*Attesting Officer*

C. MARSHALL DANN
*Commissioner of Patents and Trademarks*